(12) United States Patent
Jett et al.

(10) Patent No.: US 6,937,663 B2
(45) Date of Patent: *Aug. 30, 2005

(54) BASEBAND SIGNAL CONVERTER FOR A WIDEBAND IMPULSE RADIO RECEIVER

(75) Inventors: Preston Jett, Huntsville, AL (US); Lawrence E. Larson, Del Mar, CA (US); Bret A. Pollack, Redondo Beach, CA (US); David A. Rowe, Torrance, CA (US)

(73) Assignee: Alereon, Inc., Austin, TX (US)

( * ) Notice: Subject to any disclaimer, the term of this patent is extended or adjusted under 35 U.S.C. 154(b) by 526 days.

This patent is subject to a terminal disclaimer.

(21) Appl. No.: 10/055,007

(22) Filed: Jan. 23, 2002

(65) Prior Publication Data

US 2002/0126769 A1 Sep. 12, 2002

Related U.S. Application Data

(63) Continuation of application No. 09/356,384, filed on Jul. 16, 1999, now Pat. No. 6,421,389.

(51) Int. Cl.⁷ .............................................. H04L 27/00
(52) U.S. Cl. ...................... 375/256; 375/316; 375/340; 375/349
(58) Field of Search ............................... 375/316, 340, 375/342, 343, 349, 355, 256

(56) References Cited

U.S. PATENT DOCUMENTS

| | | |
|---|---|---|
| 3,720,950 A | 3/1973 | Vehrs, Jr. |
| 3,728,632 A | 4/1973 | Ross |
| 3,864,635 A | 2/1975 | Ewanus |
| 4,279,018 A | 7/1981 | Frosch et al. |
| 4,550,414 A | 10/1985 | Guinon et al. |
| 4,641,317 A | 2/1987 | Fullerton |
| 4,688,232 A | 8/1987 | Fox |
| 4,743,906 A | 5/1988 | Fullerton |
| 4,813,057 A | 3/1989 | Fullerton |
| 4,907,001 A | 3/1990 | Harmuth |
| 4,979,186 A | 12/1990 | Fullerton |
| 5,031,191 A | 7/1991 | Hiramatsu et al. |
| 5,105,437 A | 4/1992 | Kingston et al. |
| 5,214,669 A | 5/1993 | Zarembowitch |
| 5,345,471 A | 9/1994 | McEwan |
| 5,361,070 A | 11/1994 | McEwan |
| 5,363,108 A | 11/1994 | Fullerton |
| 5,479,120 A | 12/1995 | McEwan |
| 5,519,342 A | 5/1996 | McEwan |
| 5,523,758 A | 6/1996 | Harmuth |
| 5,523,760 A | 6/1996 | McEwan |
| 5,610,907 A | 3/1997 | Barrett |
| 5,659,573 A | 8/1997 | Bruckert et al. |
| 5,677,927 A | 10/1997 | Fullerton et al. |
| 5,748,891 A | 5/1998 | Fleming et al. |
| 5,832,035 A | 11/1998 | Fullerton |
| 5,843,139 A | 12/1998 | Goedeke et al. |
| 5,928,293 A | 7/1999 | Jobling et al. |
| 6,044,104 A | 3/2000 | Watanabe |

FOREIGN PATENT DOCUMENTS

| | | |
|---|---|---|
| DE | 31 31 186 AI | 2/1983 |
| WO | WO 91/06155 | 5/1991 |

*Primary Examiner*—Dac V. Ha
(74) *Attorney, Agent, or Firm*—Sprinkle IP Law Group (57) ABSTRACT

A baseband signal converter device for an impulse radio receiver combines multiple converter circuits and an RF amplifier in a single integrated circuit package. Each converter circuit includes an integrator circuit that integrates a portion of each RF pulse during a sampling period triggered by a timing pulse generator. The integrator capacitor is isolated by a pair of Schottky diodes connected to a pair of load resistors. A current equalizer circuit equalizes the current flowing through the load resistors when the integrator is not sampling. Current steering logic transfers load current between the diodes and a constant bias circuit depending on whether a sampling pulse is present.

7 Claims, 8 Drawing Sheets

BASEBAND SIGNAL CONVERTER FOR A WIDEBAND IMPULSE RADIO RECEIVER

This application claims benefit of and is a continuation of U.S. patent application Ser. No. 09/356,384 filed Jul. 16, 1999, now U.S. Pat. No. 6,421,389, entitled "Baseband Signal Converter for a Wideband Impulse Radio Receiver" which is hereby incorporated by reference.

BACKGROUND OF THE INVENTION

The present invention relates generally to radio receivers adapted to receive and process wideband impulse radio signals. More particularly, this invention pertains to devices and circuits for accurately converting in an impulse radio receiver a series of time-modulated radio pulses into a baseband signal.

There is a continuing need for the development of advanced wireless devices for communications of voice and data, for materials measurement, navigation, environmental sensing, radar, security and numerous other civilian and military applications of radio technology. Improvements are needed in the underlying technology to provide greater reliability, greater accuracy, lower power consumption, lower cost, reduced size, and efficient use of the limited available spectrum. Conventional narrow band AM, FM, CDMA, TDMA and similar wireless communications methods and systems have not fully met these needs.

However, there is an emerging technology called Impulse Radio (including Impulse Radar) ("IR") that offers many potential advantages in addressing these needs. Impulse radio was first fully described in a series of patents including U.S. Pat. No. 4,641,317 (issued Feb. 3, 1987), U.S. Pat. No. 4,813,057 (issued Mar. 14, 1989), U.S. Pat. No. 4,979,186 (issued Dec. 18, 1990) and U.S. Pat. No. 5,303,108 (issued Nov. 8, 1994), all invented by Larry W. Fullerton and assigned to Time Domain Corporation. The disclosure of each of these patents is incorporated in this patent specification by reference.

Impulse radio systems are generally characterized by their transmission of short duration broad band pulses on a relatively low duty cycle. In some systems these pulses may approach a Gaussian monocycle, where the instantaneous pulse bandwidth is on the order of the center frequency. The short pulse, low duty cycle mechanism produces a processing gain that may be utilized for interference rejection and channelization. Because of the extremely wide instantaneous bandwidth of the pulse, the available processing gain far exceeds what is achieved using typical conventional spread spectrum methods. This enables the utilization of many more channels at higher dynamic ranges and higher data rates than are available in the typical conventional spread spectrum system.

Impulse radio systems have further advantages in the resistance to multipath effect. Because impulse radio signals are divided in time rather than in frequency, time related effects, such as multipath interference, can be separated, resulting in lower average power and higher reliability for a given power level.

Impulse radio techniques are also useful in radar systems. Impulse radar systems enjoy the combined advantages of very short pulses at relatively low frequencies. The short pulses result in high resolution and the low frequency gives relatively high material penetration. If a radar system used a pulse of equivalent bandwidth at a higher carrier frequency, the material penetration properties would usually be impaired. This combined advantage enables IR to be used for ground penetrating radar for inspection of bridges, roads, runways, utilities and the like, and security applications, and to "see" through walls radar for emergency management situations.

Existing IR receivers typically use mixer or sampling technology which is large in size, inefficient in power consumption and which is difficult to reproduce in a manufacturing environment. This results in a high cost to the user. Improvements are thus needed in converter technology to reduce size, weight, power consumption and cost and to improve the manufacturing yield and reliability of these systems.

Impulse radio systems are not limited to transmitting and receiving Gaussian monocycle pulses. However, some basic impulse radio transmitters attempt to emit short Gaussian monocycle pulses having a tightly controlled average pulse-to-pulse interval. A Gaussian monocycle is the first derivative of the Gaussian function. However, in a real world environment, a perfect Gaussian pulse is not achievable. In the frequency domain, this results in a slight reduction in the signal bandwidth. The signals transmitted by an IR transmitter, including Gaussian monocycles, signals having multiple cycles in a Gaussian envelope, and their real world variations, are sometimes called impulses.

The Gaussian monocycle waveform is naturally a wide bandwidth signal, with the center frequency and the bandwidth dependent on the width of the pulse. The bandwidth is approximately 160% of the center frequency. In practice, the center frequency of a monocycle pulse is approximately the reciprocal of its length, and its bandwidth is approximately equal to 1.6 times the center frequency. However, impulse radio systems can be implemented where the transmitted and/or received signals have waveforms other than an ideal Gaussian monocycle.

Most prior art wireless communications systems use some variation of amplitude modulation (AM) or frequency modulation (FM) to communicate voice or data with a radio carrier signal. However, impulse radio systems can communicate information using a novel technique known as pulse position modulation. Pulse position modulation is a form of time modulation in which the value of each instantaneous value or sample of a modulating signal (e.g., a voice or data signal) is caused to change or modulate the position in time of a pulse. In the frequency domain, pulse position modulation distributes the energy over more frequencies.

In some impulse radio communications, the time position (pulse-to-pulse interval) is preferably varied on a pulse-by-pulse basis by two separate components: an information component and a pseudo-random code component. Prior art spread spectrum radio systems make use of pseudo-random codes to spread a narrow band information signal over a relatively wide band of frequencies. A spread spectrum receiver then correlates these signals to retrieve the original information signal. Unlike conventional spread spectrum systems, impulse radio systems do not need the pseudo-random code for energy spreading. In some applications, impulse radio transmitters can use pulse widths of between 20 and 0.1 nanoseconds (ns) and pulse-to-pulse intervals of between 2 and 5000 ns. These narrow monocycle pulses have an inherently wide information bandwidth. (The information bandwidth, also referred to simply as the "bandwidth", is the range of frequencies in which one or more characteristics of communications performance fall within specified limits.)

Thus, in some impulse radio systems, the pseudo-random (PN) code component is used for different purposes: channelization; energy smoothing in the frequency domain; and interference resistance. Channelization is a procedure employed to divide a communications path into a number of channels. In a system that does not use a coding component, differentiating between separate transmitters would be difficult. PN codes create channels, if there is low correlation and/or interference among the codes being used. If there were a large number of impulse radio users within a confined area, there might be mutual interference. Further, while the use of the PN coding minimizes that interference, as the number of users rises the probability of an individual pulse from one user's sequence being received simultaneously with a pulse from another user's sequence increases. Fortunately, impulse radio systems can be designed so that they do not depend on receiving every pulse. In such systems, the impulse radio receiver can perform a correlating, synchronous receiving function (at the RF level) that uses a statistical sampling of many pulses to recover the transmitted information. Advanced impulse radio systems may utilize multiple pulses to transmit each data bit of information, and each pulse may be dithered in time to further smooth the spectrum to reduce interference and improve channelization. These systems may also include a sub-carrier for improved interference resistance and implementation advantages. In other embodiments of an impulse radio system, however, each "bit" of transmitted information can be represented by a single pulse, with no coding component.

Energy smoothing in the frequency domain insures that impulse radio transmissions interfere minimally with conventional radio systems. In some impulse radio systems, optimal energy smoothing is obtained by applying to each pulse a PN code component dither having a much larger magnitude than the information component dither.

Besides channelization and energy smoothing, the PN coding can also makes impulse radio highly resistant to interference from all radio communications systems, including from other impulse radio transmitters. This is critical, as any other signals within the band occupied by an impulse signal can act as interference to the impulse radio. Because there are no unallocated bands at or above 1 GHz available for impulse radio systems, they must share spectrum with other conventional and impulse radios without being adversely affected. Using a PN code can help impulse systems discriminate between the intended impulse transmission and transmissions from others.

In many IR systems, the impulse radio receiver is a direct conversion receiver with a single conversion stage that coherently converts a series of pulses into a baseband signal. The baseband signal is the information channel for the basic impulse radio communications system. In such systems, pulse trains, not single pulses, are used for communications. Accordingly, the impulse radio transmitter in such systems generates a train of pulses for each bit of information. The data rate of such an impulse radio transmission is only a fraction of the periodic timing signal used as a time base. Each data bit modulates the time position of many of the pulses of the periodic timing signal. This yields a modulated, coded timing signal that comprises a train of identical pulses for each single data bit. Some impulse radio receivers typically integrate 200 or more pulses to yield the baseband output. Other systems use a "one pulse per bit" information transmission scheme. The number of pulses over which the receiver integrates is dependent on a number of variables, including pulse rate, bit rate, interference levels, and range.

Figure 7:
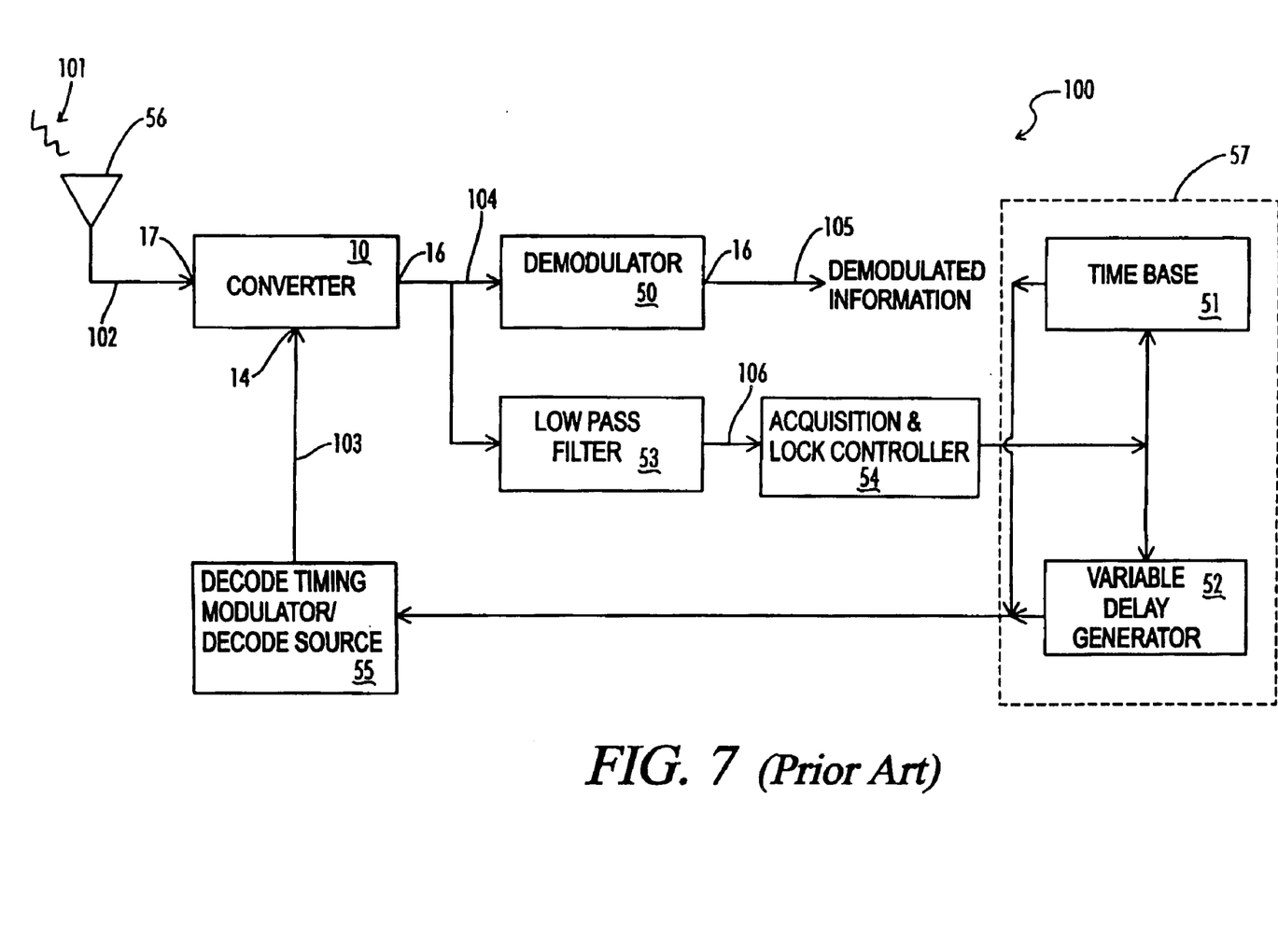
FIG. 7 is a block diagram of one embodiment of a wideband impulse radio receiver for converting time-modulated RF pulses into baseband signals.
Figure 8:
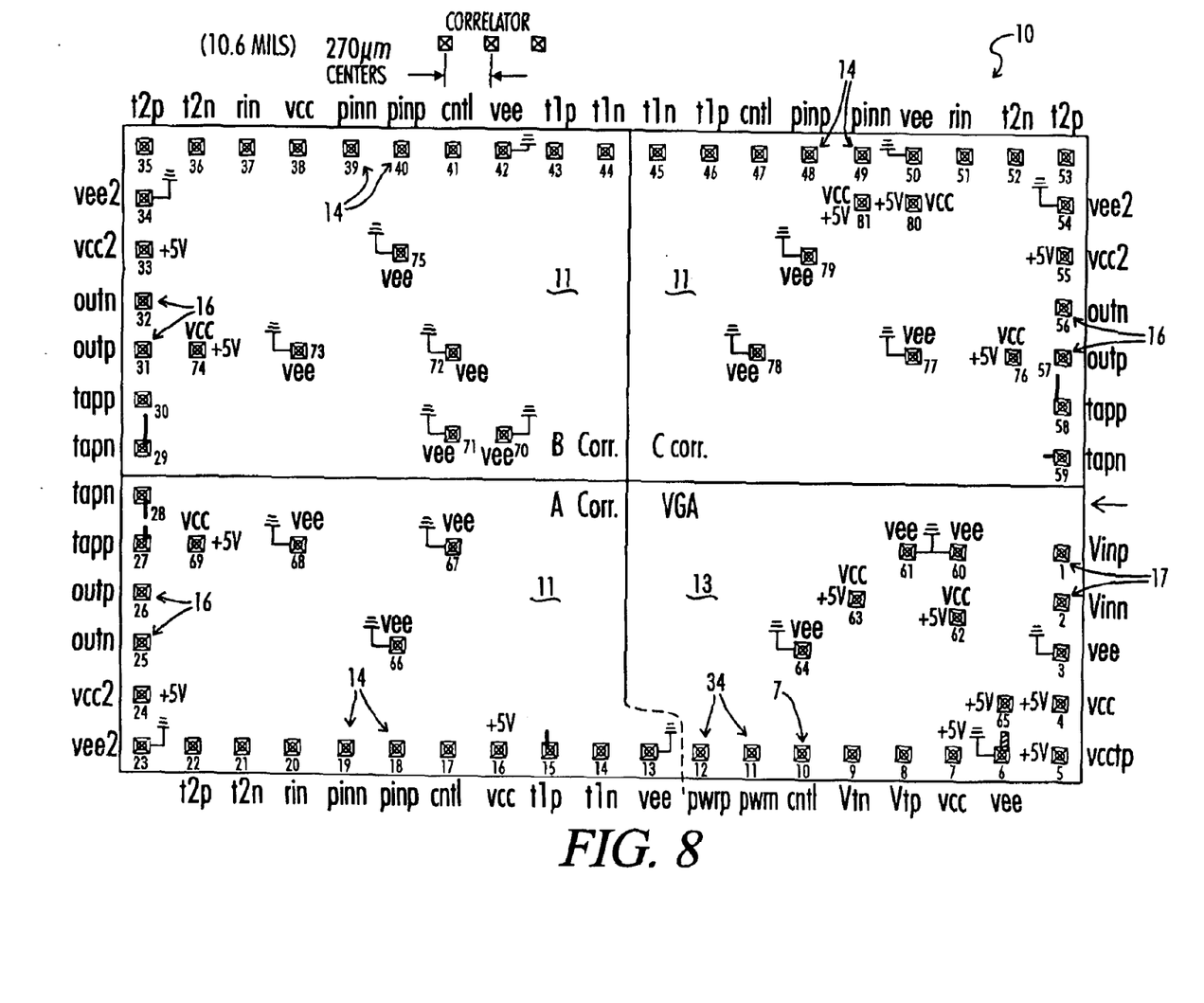
FIG. 8 is a plan view of the mechanical package and pin connections for the integrated circuit device of FIG. 1.

A block diagram of one embodiment of a basic impulse radio receiver 100 is shown in FIG. 7. The receiver 100 includes a receive antenna 56 for receiving a propagated impulse radio signal 101. The received signal is sent to a baseband signal converter 10 via a receiver transmission line 102, coupled to the receive antenna 56.

The receiver 100 also includes a decode timing modulator/decode source 55 and an adjustable time base 57. The adjustable time base 57 can be a voltage-controlled oscillator or, as shown, a variable delay generator 52 coupled to the output of a time base 51. The decode timing modulator/decode source 55 generates a primary timing pulse (decode signal 103) corresponding to the PN code used by the associated impulse radio transmitter (not shown) that transmitted the propagated signal 101. The adjustable time base 57 generates a periodic timing signal having a train of template signal pulses with waveforms substantially equivalent to each pulse of the received signal 101.

The baseband signal conversion process performed by the converter 10 includes a cross-correlation operation of the received signal 101 with the decode signal 103. Integration over time of the cross-correlated received signal generates a baseband signal 104. The baseband signal 104 is then demodulated by a demodulator 50 to yield a demodulated information signal 105. The demodulated information signal 105 is substantially identical to the information signal of the transmitter that sent the received signal 101.

The baseband signal 104 is also coupled to a low pass filter 53. The low pass filter 53 generates an error signal 106 for an acquisition and lock controller 54 to provide minor timing adjustments to the adjustable time base 57.

As noted above, the circuit or device in an impulse radio receiver that converts the received impulses into a baseband signal is sometimes referred to as a cross-correlator or sampler. The baseband signal converter of an impulse radio receiver integrates one or more pulses to recover the baseband signal that contains the transmitted information. One embodiment of a cross-correlator device usable in an impulse radio receiver is described in U.S. Pat. No. 5,677,927, issued Oct. 14, 1997, and assigned to Time Domain Corporation. The disclosure of the '927 Patent is incorporated in this specification by reference.

Unfortunately, prior art baseband signal converter devices and circuits have not been entirely satisfactory or are subject to inherent performance limitations. In general, such converter devices have been constructed from discrete electronic components. The deficiencies inherent in discrete circuit designs include high power consumption, excessive device size, and a need for careful matching and/or "fine tuning" of component values and/or operational parameters to produce accurate and consistent performance. For example, the converter circuit described in FIG. 2a of U.S. Pat. No. 4,979,186 uses a sampling bridge requiring four diodes that must be carefully matched in performance characteristics. Similarly, the converter circuit design shown in FIG. 3 of the '186 patent can produce a performance-degrading signal offset that varies over time and temperature. Moreover, the use of discrete electronic components in the converter device places undesirable limits on the switching speeds of the active components used in the circuits, making it more difficult to perform the signal conversion process using very short sample times.

A further issue that has not been satisfactorily addressed by prior art baseband signal converter designs is flexibility in application. Some important impulse radio applications can be enabled or enhanced by concurrently operating multiple baseband converter circuits in a single receiver. Scanning and rake receivers are examples of impulse radio applications where the use of two or more baseband signal converters in a single receiver would be highly desirable. Unfortunately, a baseband signal converter device that integrates multiple converter circuits in a single, low profile package has not been available in the prior art.

What is needed, then, is low profile, low power integrated circuit device containing one or more circuits that can convert time-modulated radio pulses into a baseband signal, and that is capable of executing the conversion process accurately and consistently over time and temperature using a short sample period.

SUMMARY OF THE INVENTION

In accordance with one object of the invention, a baseband signal converter device combines three independent baseband converter circuits packaged into a single integrated circuit. The device includes an RF input coupled through a wideband variable gain amplifier to corresponding RF signal inputs on each separate signal converter circuit. Separate timing pulse inputs and baseband signal outputs are provided external to the device, for each converter circuit. The variable gain amplifier has an auxiliary signal output coupled to a power detector to provide automatic gain control to the RF amplifier.

Each converter circuit in the device includes an integrator circuit coupled to the RF signal input and a pulse generator coupled to the timing pulse input. The pulse generator provides a sampling pulse to the integrator to control the period during which the integrator integrates each pulse in the RF input signal. The output of the integrator is coupled through a buffer amplifier to a track and hold circuit. A track and hold signal from a track and hold control circuit in the converter device circuit allows the track and hold circuit to track and stabilize the output of the integrator. The output of the track and hold circuit provides a baseband signal output that is usable by a conventional impulse radio demodulator within an impulse radio receiver.

The integrator circuit includes an integrator capacitor connected to a resistive load through a pair of Schottky diodes. A current source and current steering logic steers the current between the load and integrator capacitor and a separate constant bias circuit depending on whether a sampling pulse is present. In addition, a current equalizer circuit monitors the voltage across the load resistor so that an average zero voltage is maintained across the integrator capacitor.

DESCRIPTION OF THE PREFERRED EMBODIMENTS

Baseband Converter Device Overview

Figure 1:
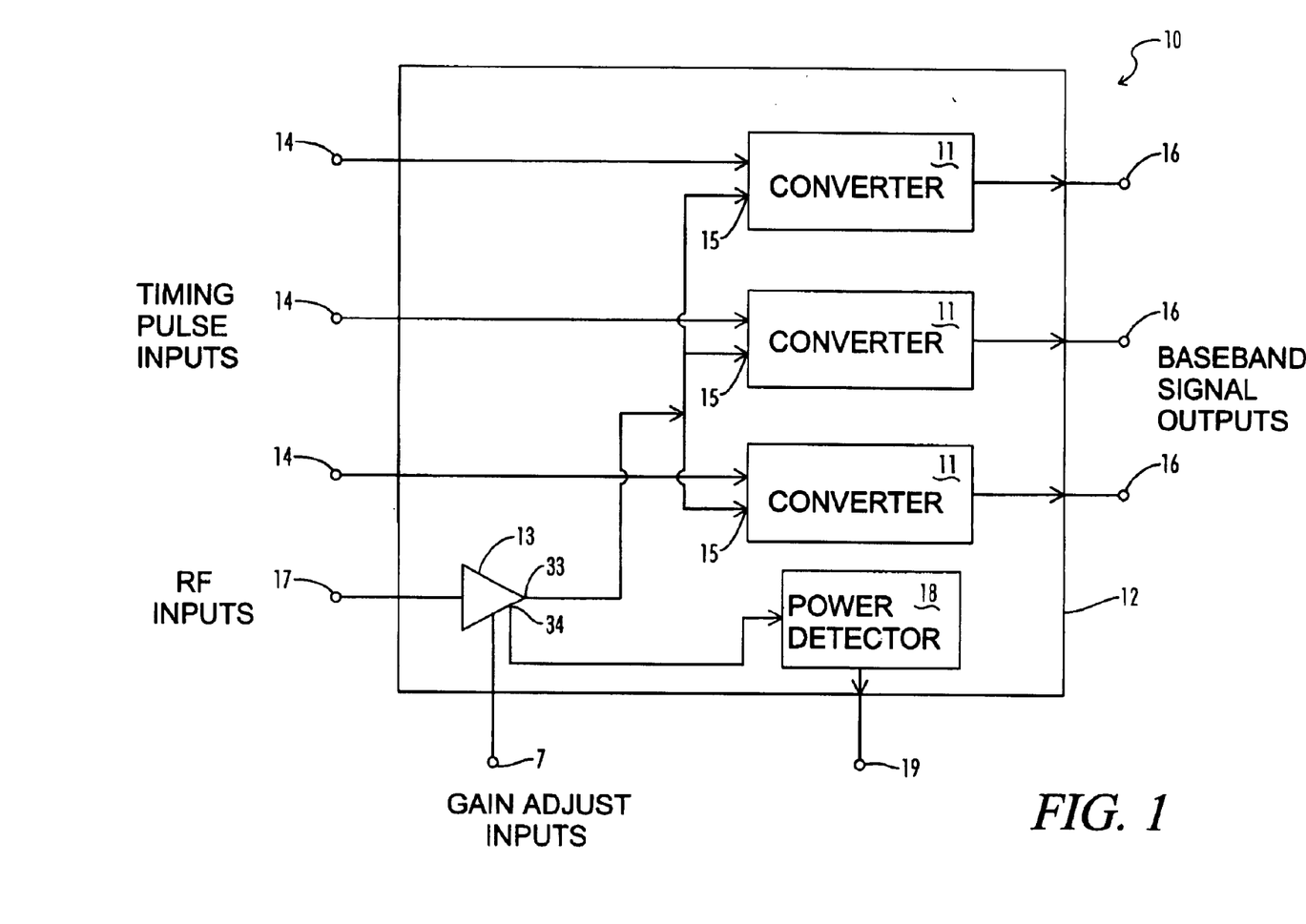
FIG. 1 is a block diagram of the baseband signal converter device of this invention, showing multiple converter circuits arranged for single or concurrent operation in a single integrated circuit.

A block diagram of one embodiment of the baseband converter device 10 of the present invention is shown in FIG. 1. Preferably, the converter device 10 is manufactured as an application specific integrated circuit (ASIC) in which the various device circuits are fabricated within a single integrated circuit device package 12. In the embodiment of FIG. 1, the device 10 includes three separate baseband converter circuits 11. Each converter circuit 11 has an RF signal input 15, a timing pulse input 14, and a baseband signal output 16. The RF signal inputs 15 for each converter circuit 11 are internally connected in parallel to the output 33 of a broadband, variable gain RF amplifier 13. The input of amplifier 13 is connected to device RF input 17 external to the device package 12 so that the device RF input 17 can be electrically coupled to an antenna 56 as part of an impulse radio receiver 100 (FIG. 7). Similarly, each timing pulse input 14 and baseband signal output 16 defines a connection point external to device package 12 so that the individual converter circuits 11 can be controlled by separate timing signals to generate separate baseband signals.

Preferably, the amplifier 13 will have an auxiliary output 34 connected to the input of a power detector 18. The signal produced by amplifier 13 at auxiliary output 34 is a rectified, low frequency auxiliary signal having electrical characteristics that correspond to variations in the power level of the signals at RF input 17. The power detector 18 uses this auxiliary signal to generate a power level signal at an external terminal 19. The power level signal at terminal 19 can be used by an external signal processor (not shown) to determine if the amplifier 13 is overloaded and, if so, to calculate and generate a gain adjust signal at gain adjust input 7. This insures that device amplifier 13 always operates to provide signals at RF signal inputs 15 that are within the operating range of converter circuits 11. In one embodiment of the device 10, the amplifier 13 will have a gain that is adjustable from 0 db to 30 db for wideband impulse radio signals between 1–4 GHz, having a magnitude of −10 dbm or lower. In addition, the amplifier 13 should be non-dispersive to pulses with a noise figure of 15 dB or less.

Although the general techniques used to manufacture the device 10 as an ASIC are well known in the art, the device circuits will preferably be fabricated using a silicon germanium process. This will enhance the ability of the transistors and other switching components within converter circuits 11 to process very short monocycle RF pulses, using timing pulses of 300 ps or less.

Converter Circuit Overview

Figure 2:
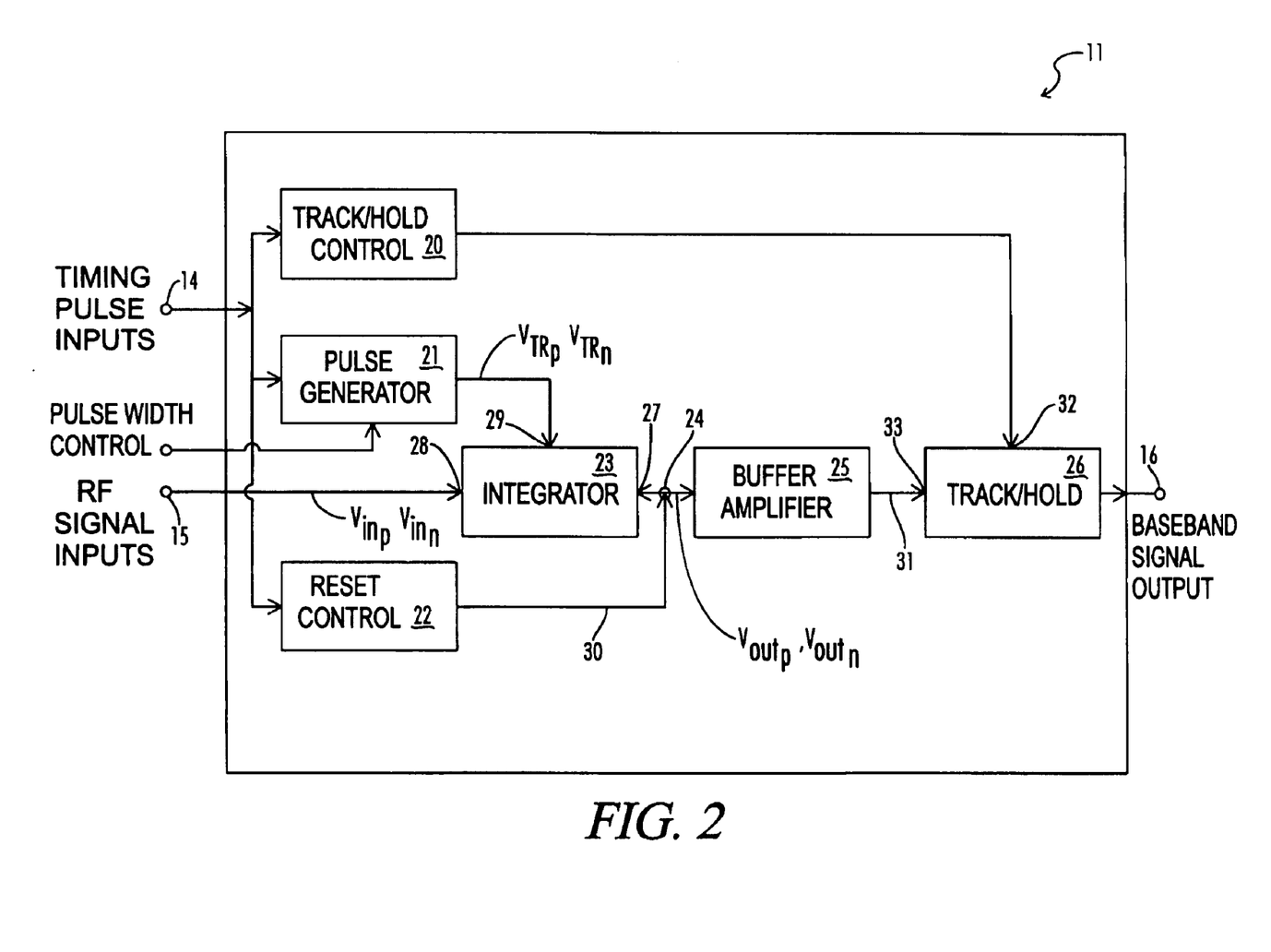
FIG. 2 is a block diagram of one of the converter circuits as used and shown in the device of FIG. 1.

FIG. 2 is a block diagram showing the internal subsystems of a preferred embodiment of the converter circuit 11. The RF signal input 15 is electrically connected to input 28 of an integrator circuit 23 to provide a differential RF input signal $V_{inp}$, $V_{inn}$. The converter circuit 11 also includes a track/hold control 20, a pulse generator 21, and a reset control 22, each having timing inputs connected in parallel to corresponding timing pulse input 14. This allows track/hold control 20, pulse generator 21, and reset control 22 to function in response to a primary timing pulse (PG on FIG. 6) at timing pulse input 14.

In response to the primary timing pulse PG at input 14, the pulse generator 21 generates a sampling pulse as a differential signal $V_{TRp}$, $V_{TRn}$ at input 29 of integrator circuit 23. An external pulse width control input (FIG. 2) can be used to adjust the width of the sampling pulse to set the duration of the sampling and non-sampling periods. Using the novel methods described below, the integrator circuit 23 responds to the sampling pulse $V_{TRp}$, $V_{TRn}$ and integrates the RF input signal $V_{inp}$, $V_{inn}$ to provide a differential integrator output signal $V_{outp}$, $V_{outn}$ at integrator output 27. The integrator output 27 is coupled to signal input 33 of track/hold circuit 26 through a buffer amplifier 25. The output of track/hold control 20 is connected to control input 32 of track/hold circuit 26. Track/hold circuit 26, as will be described below, generates a baseband output signal at baseband signal output 16, in response to the integrator output signal $V_{outp}$, $V_{outn}$ and to a track and hold control signal at control input 32.

Integrator Circuit

Figure 3:
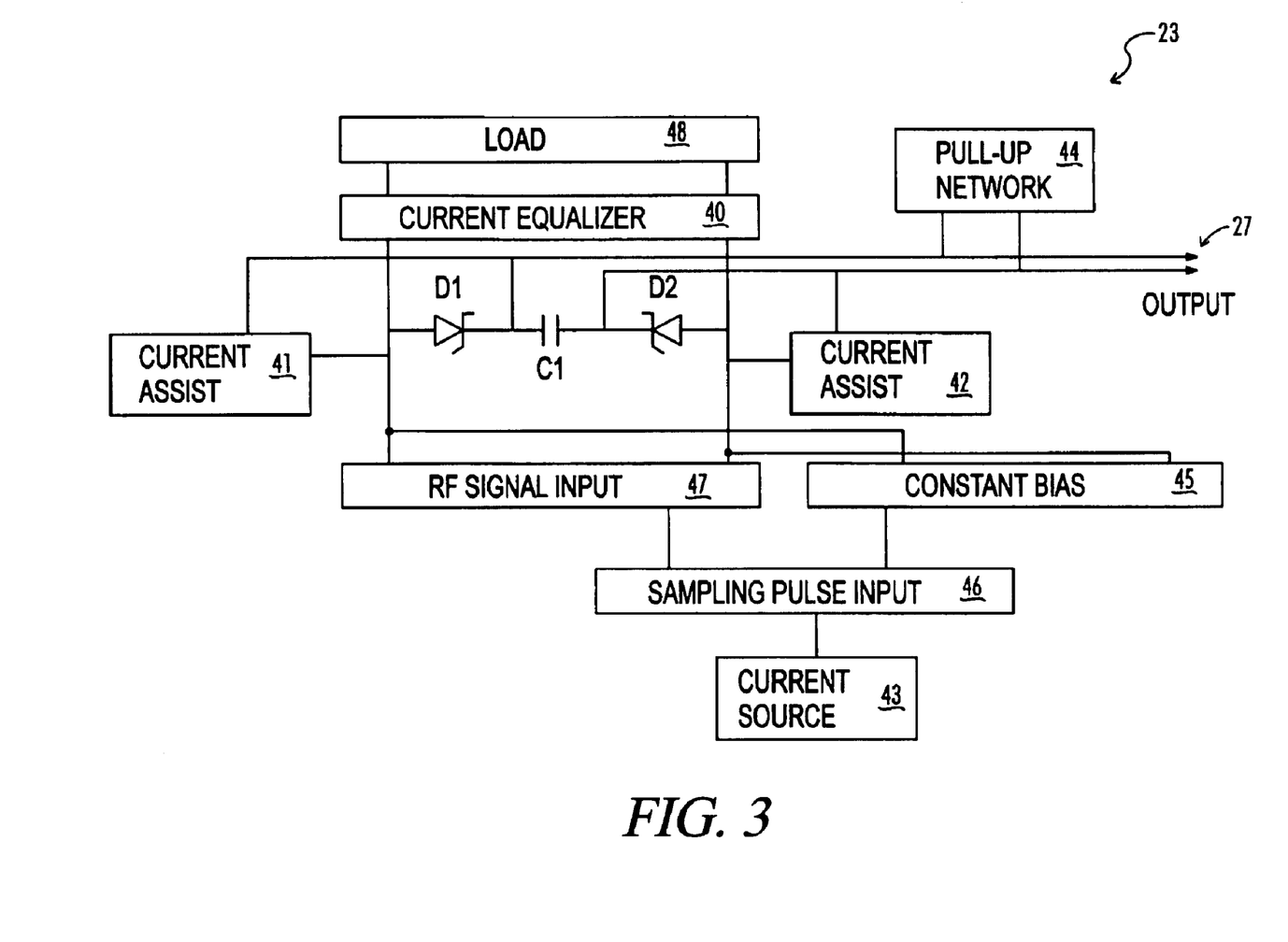
FIG. 3 is a block diagram of the signal integrator circuit used in the converter circuit of FIG. 2.
Figure 4:
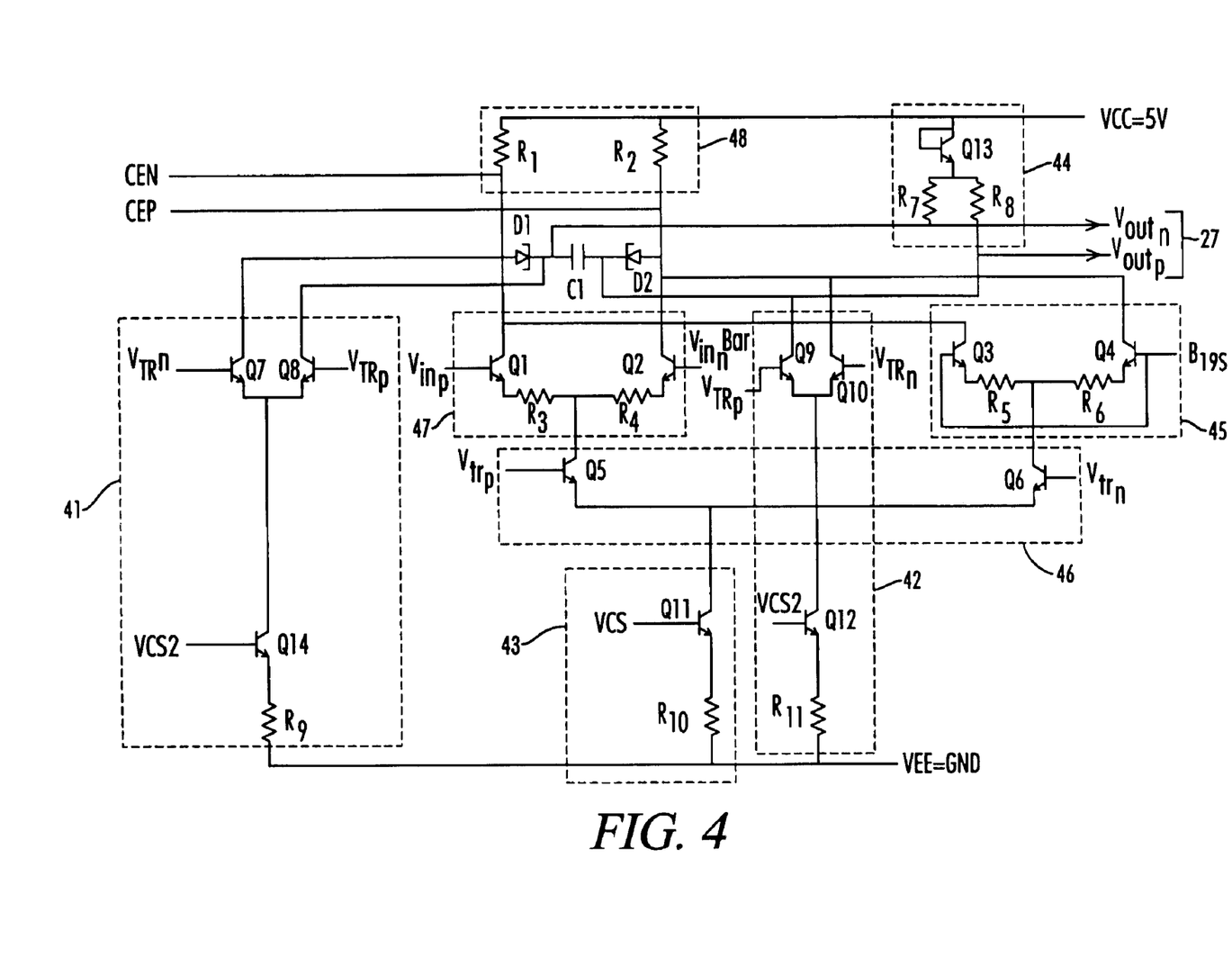
FIG. 4 is a schematic diagram of a first portion of a preferred embodiment of the signal integrator circuit of FIG. 3.
Figure 5:
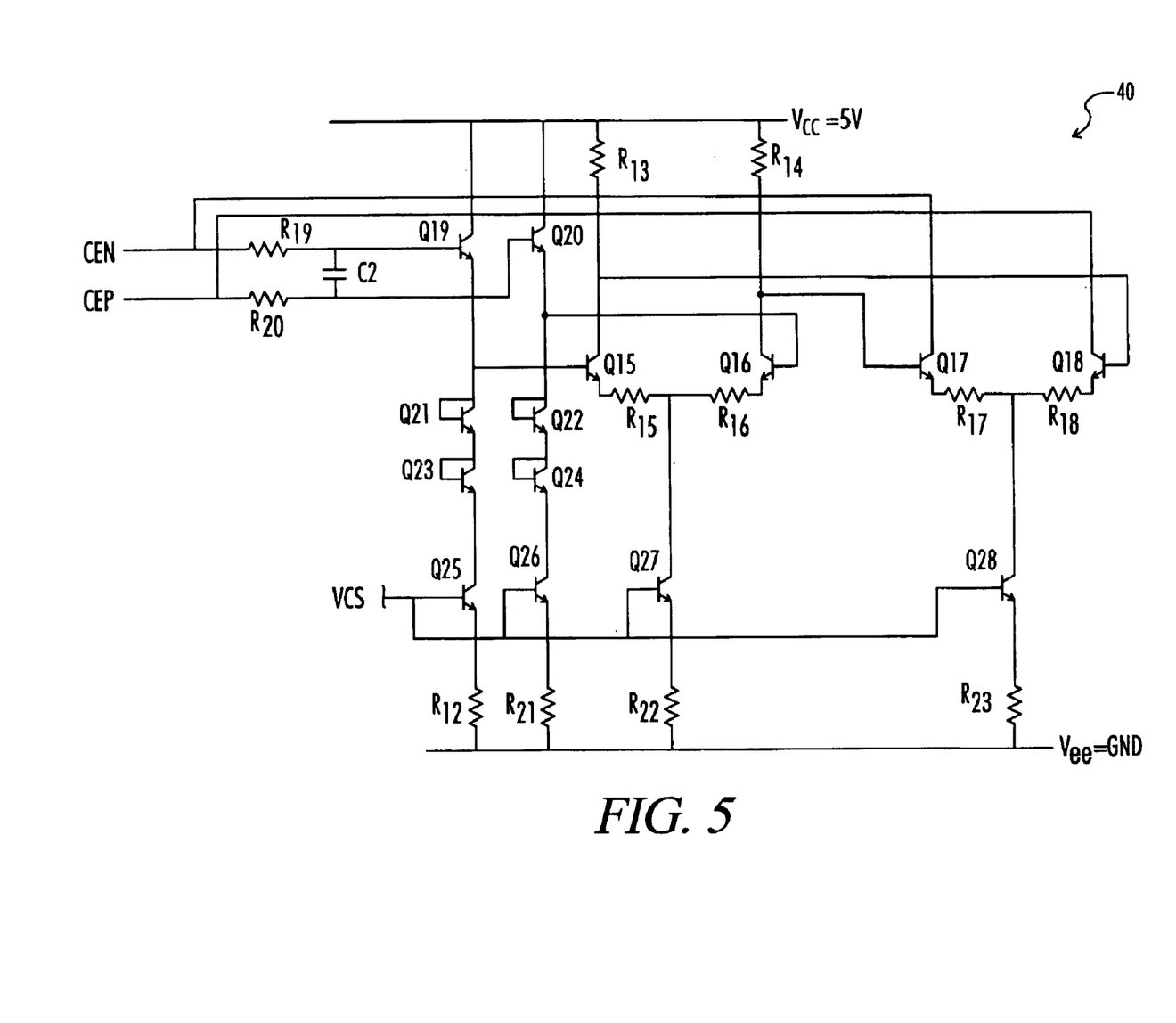
FIG. 5 is a schematic diagram of a second portion of the preferred embodiment of the signal integrator circuit of FIG. 3, showing the current equalizer circuit.

Additional detail describing integrator circuit 23 is provided in block diagram form in FIG. 3, and in the electrical schematics of FIGS. 4 and 5. The differential RF input signal $V_{inp}$, $V_{inn}$ is provided to the bases of a differential transistor pair Q1, Q2 that forms, along with corresponding emitter resistors R3 and R4, the RF signal input stage 47. The collectors of transistors Q1, Q2 are electrically connected to integrator capacitor C1 through a pair of Schottky diodes D1 and D2. A load 48, comprising load resistors R1 and R2, is connected across the integrator capacitor C1, again through diodes D1 and D2. The load resistors R1 and R2 are also connected to a 5 VDC supply voltage VCC and to a current equalizer circuit 40 (FIG. 5) at a current equalizer differential signal input (see signal $C_{en}$, $C_{ep}$ on FIGS. 4 and 5).

A first current assist circuit 41, comprising differential transistor pair Q7, Q8, transistor Q14 and emitter resistor R9, is connected across diode D1. Similarly, a second current assist circuit 42, comprising differential transistor pair Q9, Q10, transistor Q12, and emitter resistor R11, is connected across diode D2. Transistors Q14 and Q12 (with emitter resistors R9 and R11) are driven by a constant base voltage Vcs2 to act as current sources for current assist circuits 41, 42 respectively. Current assist circuits 41 and 42 function to switch the diodes D1 and D2 from a low impedance state to a high impedance state, as described below.

The sampling pulse $V_{TRp}$, $V_{TRn}$ (provided at input 29 of integrator circuit 23) is coupled to the bases of differential transistor pair Q5, Q6 which form sampling pulse input circuit 46. The emitters of transistors Q5 and Q6 are connected to the collector of transistor Q11. Because the base of transistor Q11 is driven by a constant bias voltage Vcs, Q11 forms, in conjunction with resistor R10, a current source 43.

A constant bias circuit 45, comprising transistor pair Q3, Q4, and corresponding emitter resistors R5 and R6, is connected across integrator capacitor C1, again through diodes D1 and D2, respectively. The bases of transistors Q3 and Q4 are connected to a common bias voltage. In conjunction with current source 43 and sampling pulse input circuit 46, constant bias circuit 45 causes current to flow through the load 48 even when the sampling pulse $V_{TRp}$ is low (non-sampling period), or when there is no RF pulse $V_{inp}$, $V_{inn}$ present. In other words, the load current sourced through Q11 is "steered" by this current steering logic during the absence of a positive sampling pulse (a non-sampling period when $V_{TRp}$ is low at the base of Q5) through Q3 and Q4. By steering the load current to Q3, Q4 (when $V_{TRn}$ is low), and to D1, D2, Q8, and Q9 when $V_{TRp}$ is high, rather than simply switching the load current on and off, the unwanted "ground bounce" noise that might otherwise be generated within the integrator circuit 23 is minimized.

A pull up network 44, including transistor Q13 and resistors R7 and R8, is connected between the supply voltage Vcc and the integrator output 27.

The novel current equalizer circuit 40 of this invention is schematically illustrated on FIG. 5. The fundamental purpose of current equalizer circuit 40 is to adjust the current flow through load resistors R1 and R2 when the converter circuit 11 is not sampling the RF input signal $V_{inp}$, $V_{inn}$ that is when $V_{TRp}$ is low. By adjusting the current flow through the load resistors R1 and R2 during this time (no sampling pulse), a zero voltage is applied across diodes D1 and D2. This eliminates any offset voltage that would otherwise have to be corrected or compensated for.

The Schottky diodes D1 and D2 are in a high impedance state when Q8 and Q9 are turned off. This isolates the integrator capacitor C1 from the rest of the integrator circuit 23. When the timing pulse PG (FIG. 2) at timing pulse input 14 is low, the reset control 22 causes the reset circuit 24 (FIG. 2) to discharge the integrator capacitor C1. When the timing pulse PG at timing pulse input 14 goes high, the reset control 22 is disabled. Without the isolation provided by the diodes D1 and D2, the voltage across capacitor C1 would decay too quickly and the ability of the integrator circuit 23 to process the narrow pulses inherent in impulse radio would be degraded. As described with reference to the preferred embodiment, the high impedance state achieved by the diodes D1 and D2 must be such that the voltage across integrator capacitor C1 does not fall or "droop" by an amount that will create an error, before the track and hold circuit 26 can acquire it.

The current equalizer signal $C_{en}$, $C_{et}$ developed across the load resistors R1 and R2 is coupled to the bases of transistor pair Q19, Q20 of current equalizer circuit 40, through the low pass filter formed by R19, R20, and C2. The emitters of transistor Q19 and Q20 are connected to the bases of transistor pair Q15 and Q16, respectively. The collectors of transistors Q15 and Q16 are connected to the supply voltage Vcc (through resistors R13, R14) and to the bases of transistor pair Q17, Q18. The collectors of transistors Q17 and Q18 are connected directly across load resistors R1 and R2 (FIG. 4) respectively. The bases of transistors Q25, Q26, Q27, and Q28 are driven by a constant bias voltage Vcs so that, in combination with emitter resistors R12, R21, R22, and R23, they act as current sources for transistors Q19, Q20, and for transistor pairs Q15, Q16 and Q17, Q18. Transistors Q21–Q24 function as diodes to limit the collector voltage at Q25 and Q26 to a level that is less than their breakdown voltages. Therefore, transistors Q17 and Q18 can respond to changes in the current equalizer signal $C_{en}$, $C_{et}$ to adjust and equalize the current through load resistors R1 and R2 (FIG. 4). This will maintain a zero average voltage across the integrator capacitor C1 when the integrator circuit 23 is not sampling the RF input signal $V_{inp}$, $V_{inn}$.

When the integrator is sampling during the sampling period ($V_{TRp}$ is high), the current equalizer circuit 40 has little effect because transistors Q5, Q8 and Q9 are turned on for a short period that is not significant compared to the time constant of the low pass filter formed by R19, R20, and C2 (FIG. 5). During this sampling period, the transistor pairs Q7, Q8 and Q9, Q10 forward bias the diodes D1 and D2. This places the diodes D1 and D2 in a low impedance state such that the time constant formed by the diodes in combination with capacitor C1 is less than the sampling period. When the integrator circuit 23 is finished sampling (non-sampling period, $V_{TRp}$ is low), Q8 and Q9 (as part of current assist circuits 41 and 42) turn off as Q7 and Q10 turn on. This places the diodes D1 and D2 in a high impedance state, again isolating the integrator capacitor C1 from the rest of the integrator circuit 23. The voltage across C1 (Voutp, Voutn) will then remain relatively constant, corresponding to the RF input signal $V_{inp}$, $V_{inn}$, integrated over the duration of the sampling pulse $V_{TRp}$, $V_{TRn}$. Using this novel arrangement, the integrator output signal Voutp, Voutn will not be critically affected by errors created by mismatched load resistors, ground bounce noise, or variations in temperature that may alter component values in the converter circuit 11.

Operation of the Baseband Converter Device

Figure 6:
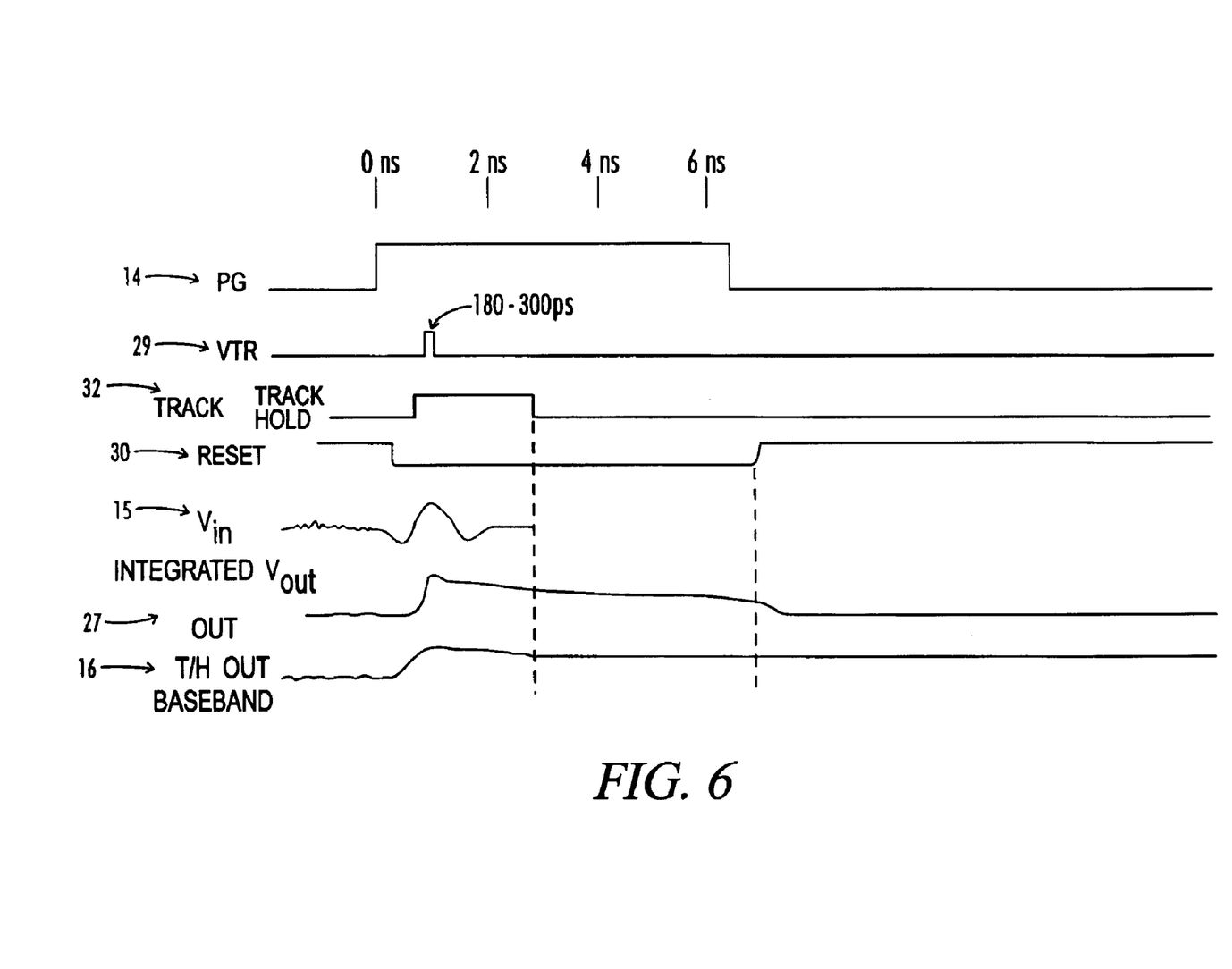
FIG. 6 is a timing diagram showing the relationship between the RF pulses, timing signals, and baseband output signals as used and generated in the converter circuit of FIG. 2.

Referring now to FIGS. 1–7, the operation of the baseband converter device 10 can be understood, with reference to a single RF monocycle pulse $V_{in}$ (FIG. 6). Assuming that the converter device 10 is used in conjunction with a typical impulse radio receiver 100 as shown in FIG. 7, a periodic primary timing pulse PG is generated by a decode timing modulator/decode source 55 and coupled to timing pulse input 14. Typically, each primary timing pulse PG will have a pulse width of 6 ns or less. The incoming primary timing pulse PG triggers the pulse generator 21 to generate a sampling pulse $V_{TR}$ at input 29 of integrator circuit 23. As shown on FIG. 6, the sampling pulse $V_{TR}$ is delayed following the leading edge of primary timing pulse PG. The length of the delay is not critical and will typically be between 1 and 2 ns. However, the length of the delay must be fixed precisely within a few picoseconds. The sampling pulse $V_{TR}$ is narrow, having a fixed width that can range between 180 and 300 ps, such that an appropriate segment of each RF input pulse $V_{in}$ can be sampled and integrated. As described above, the length of the sampling pulse $V_{TR}$ determines the period during which the integrator circuit 23 is processing and integrating the RF pulses.

Looking at FIG. 4, the sampling pulse $V_{TR}$ is provided as differential input signal $V_{TRp}$, $V_{TRn}$ at the bases of transistor pairs Q7, Q8; Q5, Q6; and Q9, Q10. Therefore, when the sampling pulse $V_{TR}$ is high, Q8 is turned on, allowing a load current to flow through R1, D1, Q8, and Q14. Similarly, during the sampling period defined by when sampling pulse $V_{TR}$ is high, a load current will flow through R2, D2, Q9, and Q12. If there is an RF pulse ($V_{inp}$ is high) during the time that sampling pulse $V_{TRp}$ is high, both transistors Q1 and Q5 will be turned on. Because diodes D1 and D2 are in a low impedance state at this time, a differential, non-zero voltage is applied across integrator capacitor C1. At the end of the sampling period ($V_{TRp}$ is low), transistor Q5 is turned off, and transistor Q6 is turned on, steering the load current through transistors Q3, Q4, Q6, and Q11, with diodes D1 and D2 isolating capacitor C1. This produces an integrator output signal $V_{outp}$, $V_{outn}$ at integrator output 27 that corresponds to the sampled portion of the RF input pulse $V_{in}$, integrated during the sampling period defined by the sampling pulse $V_{TR}$.

As described above, during the period that the integrator circuit 23 is not sampling ($V_{TRp}$ is low), the current equalizer circuit 40 is monitoring the voltages across load resistors R1 and R2. Any change in voltage caused by unmatched resistors R1 and R2, or by variations in ambient conditions, is compensated for by the current equalizer circuit 40.

As best seen on FIG. 2, the integrator output signal $V_{outp}$, $V_{outn}$, after being amplified in buffer amplifier 25, is coupled to input 33 of track and hold circuit 26. In response to a track and hold pulse (FIG. 6) generated by track and hold control circuit 20, and coupled to input 32 of track and hold circuit 26, track and hold circuit 26 "tracks" the integrator output $V_{outp}$, $V_{outn}$ of integrator circuit 23 while the track and hold pulse is high and holds the tracked integrator output during the period that the track and hold control pulse is low. As shown in FIG. 6, the track and hold pulse, although triggered by the primary timing pulse PG, is delayed to begin after the primary timing pulse PG but before the sampling pulse $V_{TR}$ begins. The track and hold pulse must be wide enough to stabilize the voltage across C1, which is not changing when $V_{TRp}$ is low. Preferably, the track and hold pulse will be 2–6 ns wide, +/–0.1 ns. The integrator output $V_{outp}$, $V_{outn}$ signal, as tracked by the track and hold circuit 26, will then be held until the next RF pulse $V_{in}$ appears, which will ordinarily occur at approximate 100 ns intervals.

In the preferred embodiment, functional blocks 20 and 26 have been referred to and described using the phrase "track and hold." However, those of skill in that art will recognize that a circuit or functional block referred to in the art as a "sample and hold" circuit will function in an equivalent manner, in that all sample and hold circuits have some finite "aperture" time during which the signal is being tracked.

In an impulse radio system where each data bit in the information component is represented by a single pulse, an impulse radio signal will comprise a train of hundreds of time-modulated pulses (only one of which is illustrated on FIG. 6). Therefore, the process described above will have to be repeated many times within the converter device 10 in order to obtain a complete baseband signal. To facilitate this, the reset control circuit 22 generates a reset pulse on reset line 30 (FIG. 2) that goes low in response to the primary timing pulse PG. Essentially, except for unavoidable switching delays inherent in the circuitry, the reset pulse is an inverted version of the primary timing pulse PG. The reset pulse is sent to a reset circuit 24 (a FET switch for example) that is coupled to output 27 of integrator circuit 23. When the reset pulse goes low, the integrator output 27 is effectively shorted by the reset device 24, so that the integration process can begin again with a zero voltage across integration capacitor C1 (FIG. 3). The track and hold circuit 26 is conventional in design, and can simply be a FET switch connected to a capacitor, where the FET switch is open during the hold period.

The output of the track and hold circuit 26 thereby provides, at baseband output 16, a baseband output signal from the converter circuit 11. The baseband output signal can then be coupled to the input of a conventional impulse radio demodulator 50 (FIG. 7) where the information component of the impulse radio signal can then be extracted.

The operation of the converter device 10 of this invention has been described with only one converter circuit 11 being used by an impulse radio receiver, having the configuration represented by FIG. 7. However, the converter device 10 can be used in other receiver configurations (including radar systems) and for that purpose has been provided, as shown in FIG. 1, with three converter circuits 11 that can function independently. For example, an impulse radio scanning receiver would benefit from using two converter circuits 11 concurrently to look for multiple transmissions having different PN code components (that is, signals transmitted on different "channels"). To improve the rejection of unwanted multi-path signal interference, a rake receiver could use two or more converter circuits as well.

The application of the novel converter device of this invention has been described in one embodiment of a wideband impulse radio system in which the impulse waveform (Vin) is shown on FIG. 2 as an idealized Gaussian monocycle. Due to system and component limitations, or for other design reasons, the actual waveform shown on FIG. 2 may be not be a true monocycle pulse. Persons of ordinary skill in the art will recognize that impulse radio systems are not limited to any particular impulse shape or characteristic. The converter device of this invention can be used in impulse radio systems where the RF impulses being converted are not monocycles and/or do not have a Gaussian wave shape, where the impulses are transmitted at different frequencies and bandwidths, and with or without coding components being applied to the signal.

Thus, although there have been described particular embodiments of the present invention of a new and useful Baseband Signal Converter for a Wideband Impulse Radio Receiver, it is not intended that such references be construed as limitations upon the scope of this invention except as set forth in the following claims. Also, although certain embodiments of the invention have been described in combination with specified functional and operational parameters, these parameters are provided for illustrative purposes only and are not deemed limitations on the scope of the invention.

What is claimed is:

1. A device for converting RF pulses received by a wideband impulse radio receiver into one or more baseband signals, the device comprising:
   a. an RF input for receiving the RF pulses;
   b. multiple timing inputs for receiving separate timing signals;
   c. multiple converter circuits, the converter circuits each having a signal input electrically coupled in parallel to the RF input;
   d. each converter circuit having a second input electrically coupled to one of the timing inputs such that each converter circuit can receive one of the separate timing signals;
   e. each converter circuit having a baseband signal output; and
   f. the device is packaged as a single integrated circuit in which the converter circuits are arranged on a common substrate for single or concurrent operation.

2. The device of claim 1 further comprising an RF amplifier having an input coupled to the RF input and an output coupled to the signal inputs of the converter circuits.

3. The device of claim 2 further comprising a power detector circuit operatively connected to the RF amplifier, the power detector circuit responsive to the RF amplifier.

4. The device of claim 1 wherein each converter circuit includes a signal integrator that is responsive to one of the separate timing signals and that integrates the RF pulses to provide a converter output signal coupled to a corresponding one of the baseband signal outputs.

5. A wideband impulse radio receiver comprising:
   a. an antenna input for receiving time-modulated RF pulses;
   b. multiple converter circuits, each converter circuit having an RF signal input electrically connected in parallel with the RF signal inputs on the other converter circuits and to the antenna input, a timing input electrically connected to a corresponding timing signal generator, and a baseband signal output;
   c. each converter circuit operable to convert at least a portion of the RF pulses into a baseband signal at a corresponding one of the baseband signal outputs; and
   d. the converter circuits and timing signal generators are arranged on a common substrate within a single integrated circuit package such that one or more of the converter circuits can function separately or concurrently to produce separate baseband signals at the corresponding baseband signal outputs.

6. The impulse radio receiver of claim 5 further comprising a demodulator operatively connected to each of the baseband outputs.

7. The impulse radio receiver of claim 6 wherein the RF pulses are modulated by a coding component and the receiver further comprises a decode timer operatively connected to each of the converter circuits.

* * * * *